Dec. 23, 1930.  J. M. J. DORMOY  1,786,195
POWER BRAKING APPARATUS
Filed Oct. 31, 1928
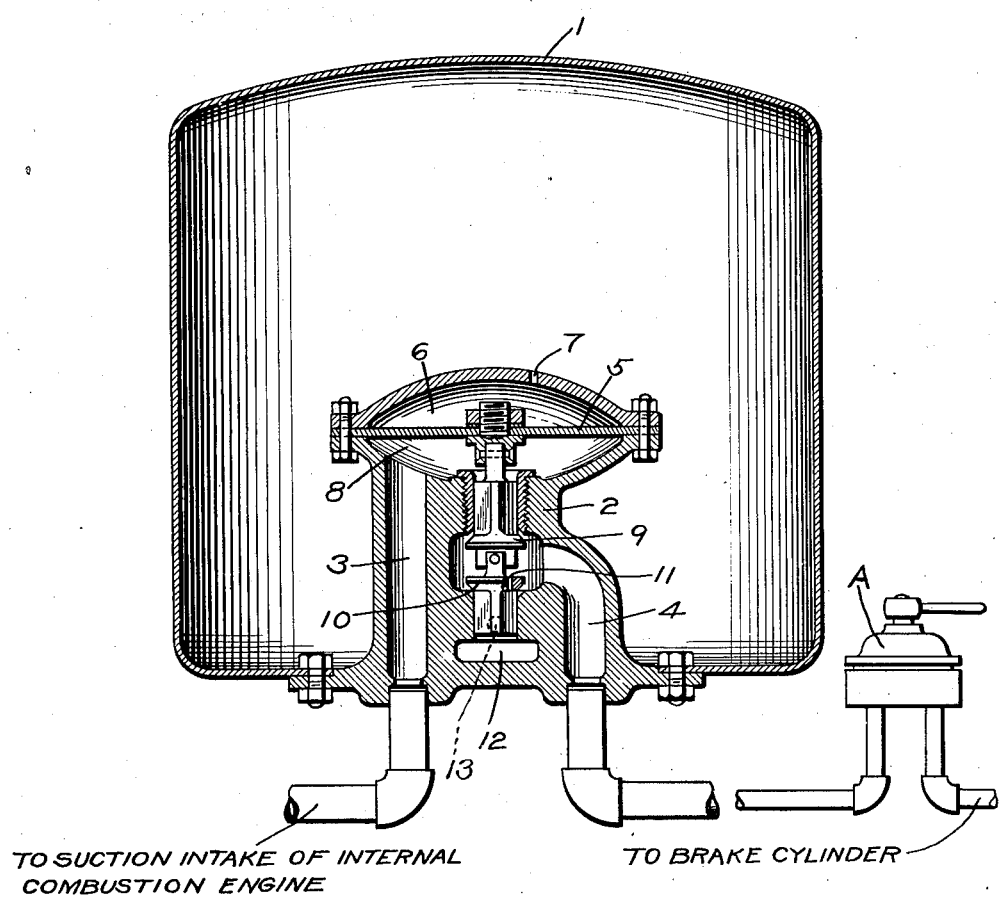
TO SUCTION INTAKE OF INTERNAL COMBUSTION ENGINE
TO BRAKE CYLINDER
INVENTOR
JULES MARIE JOSEPH DORMOY
BY
ATTORNEY

UNITED STATES PATENT OFFICE

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA

POWER BRAKING APPARATUS

Application filed October 31, 1928, Serial No. 316,289, and in Great Britain November 26, 1927.

This invention relates to fluid pressure braking apparatus for automobile and the like vehicles and has for its object to provide improved apparatus of this character.

The source of power usually utilized for operating fluid pressure brakes on automobile vehicles is the partial vacuum obtaining in the induction or suction intake pipe of the engine of the vehicle in the case of vacuum brakes or air compressed by the operation of the engine or a device operatively connected thereto in the case of brakes of the compressed air type, the source of power being arranged to be directly connected to the brake cylinder or cylinders of the apparatus by means of a suitable valve device under the control of the driver.

The pressure or vacuum developed for braking purposes by the operation of the engine and constituting a primary source of power is arranged to create in a reservoir a corresponding pressure or vacuum constituting an auxiliary source of power, and according to the present invention arrangements are provided adapted automatically to render one or other or both of the two sources of power available to the driver for braking purposes according to particular conditions of operation. For instance, if the engine should stall the pressure or vacuum obtaining in the reservoir will be automatically rendered available to the driver for braking purposes and the vehicle can thus be braked by means of the fluid pressure braking apparatus even when the engine is not operating. On the other hand, if, as may be the case, immediately after starting, the air in the reservoir is substantially at normal pressure, that is to say, at atmospheric pressure, the pressure or vacuum developed by the engine is automatically rendered directly available to the driver for braking purposes. The pressure or vacuum developed directly by the engine and that obtaining in the reservoir are both rendered available to the driver for braking purposes under certain conditions of operation, preferably in such a manner as to render substantially constant the power available to the driver for braking purposes despite variations occurring in the primary source of power so that a predetermined actuation of the brake pedal, for example, shall always result in the same braking pressure being obtained, and in the case of braking apparatus of the vacuum type, the reservoir may be so arranged as not to affect the quality of the combustible mixture supplied to the engine through the induction pipe.

In a preferred constructional form of the invention as applied to braking apparatus of the vacuum type, communication between the induction pipe and a pipe leading to a distributing valve device under the control of the driver and between the latter pipe and the vacuum reservoir is arranged to be automatically controlled by means of a valve device, adapted to be influenced by the vacuum obtaining in the induction pipe and that obtaining in the vacuum reservoir acting on opposite sides of an abutment. When the engine of the vehicle is started, communication between the induction pipe of the engine and the pipe leading to the distributing valve device is automatically established by the valve device, communication between the induction pipe and the vacuum reservoir being permitted through a restricted port, and the communication between the vacuum reservoir and the pipe leading to the distributing valve device is substantially cut off. During operation of the engine, air is exhausted from the vacuum reservoir through the restricted port, and when the vacuum obtaining within the reservoir attains a predetermined value, the valve device is automatically actuated to establish communication between the vacuum reservoir and the pipe leading to the distributing valve device, communication between the induction pipe and the pipe leading to the distributing valve device being restricted or cut off.

The valve device itself is preferably so arranged that the vacuum obtaining in the induction pipe of the engine and that obtaining in the vacuum reservoir when rendered available together for braking purposes are each rendered available to an extent dependent upon the pressures obtaining in the induction pipe and vacuum reservoir respectively.

In order that the invention shall be clearly understood, a preferred constructional embodiment thereof as applied to vacuum by braking apparatus will now be described, by way of example, with reference to the single figure of the accompanying drawing.

Referring now in detail to the drawing, the apparatus comprises a vacuum reservoir 1 and a valve device 2 adapted to control communication between a conduit 3 adapted to be connected to the induction pipe of the engine of an automobile vehicle and a conduit 4 adapted to be connected to a pipe leading through a distributing valve device A to the brake cylinder or cylinders (not illustrated in the drawings) of the apparatus and between the conduit 4 and the vacuum reservoir 1.

The valve device 2 is mounted within the vacuum reservoir 1, a movable abutment 5 mounted in the body portion of the valve device being arranged to be influenced in the chamber 6 on its upper face by the vacuum obtaining in the vacuum reservoir 1, a small port 7 being provided in the wall of the chamber 6 for this purpose, and in the chamber 8 on its lower face to the vacuum obtaining in the induction pipe of the engine. The abutment is operatively connected to two valves 9 and 10, the valve 9 being adapted to control communication between the conduits 3 and 4 and the valve 10 being adapted to control communication between the conduit 4 and the vacuum reservoir 1.

In the valve 10 a restricted port 11 is provided through which air is arranged to be withdrawn from the reservoir 1 into the induction pipe of the engine during the operation of the latter, and the two valves are preferably so arranged in the body portion of the valve device that the effective cross sectional area of the conduit leading to the distributing valve device of the apparatus shall be substantially constant.

In operation, when the engine of the vehicle is started, the vacuum obtaining in the induction pipe of the engine acting in the chamber 8 on the abutment 5 causes the latter to descend and open the valve 9 so as to establish communication, through the conduits 3 and 4, between the induction pipe of the engine and the pipe leading to the distributing valve device under the control of the driver, the abutment 5 being subject in the chamber 6 to the pressure obtaining in the vacuum reservoir 1, that it to say, atmospheric pressure at starting. At the same time, the valve 10 is applied to its seat so that communication between the vacuum reservoir 1 and the conduit 4 leading to the distributing valve device is substantially cut off. During the operation of the engine, air is withdrawn from the vacuum reservoir by way of chamber 12, which is connected through a passage 13 with the reservoir 1, and the restricted port 11 in the valve 10. Owing to the volume of the reservoir 1, the pressure therein does not immediately fall to that in the pipe 3 and acting on the lower face of the diaphragm 5, even though the valve 10 be wide open and consequently the pressure acting in chamber 6 on the diaphragm 5 will exceed that acting in chamber 8 on the diaphragm, so that, as before stated, the diaphragm 5 in starting the engine, will be depressed. When the vacuum created in the vacuum reservoir 1 attains a predetermined value, the abutment 5 will move upwards and open the valve 10 so as to establish communication between the conduit 4 leading to the distributing valve device and the vacuum reservoir 1, communication, through the conduits 3 and 4 between the induction pipe and the pipe leading to the distributing valve device, being correspondingly restricted by the valve 9, so that during normal operation two sources of power are available to the driver for braking purposes.

In the event of the engine of the vehicle stalling or being run at low speed even if the vehicle is travelling at a relatively high speed, the vacuum obtaining in the induction pipe of the engine is not sufficient to hold the abutment 5 in its lower position against the action of the vacuum obtaining in the reservoir 1, and the abutment therefore ascends so as to close the valve 9 and thus cut off communication between the induction pipe of the engine and the pipe leading to the distributing valve device and open the valve 10 to a greater extent.

The improved arrangements hereinabove described render fluid pressure braking apparatus for automobile vehicles very reliable in operation as the driver has always at his disposal one or other or both of two sources of power for braking purposes and moreover, since the valve device 2 controlling communication between these two sources and the pipe leading through the distributing valve device to the brake cylinder or cylinders of the apparatus are so arranged that the effective cross section of the latter pipe is substantially constant whether both valves 9 and 10 are partially open or whether either of the valves is closed, a substantially constant braking effort can be obtained at any instant despite variations in the operation of the engine of the vehicle. Furthermore, since the vacuum reservoir 1 is normally evacuated through a restricted port 11 by the vacuum obtaining in the induction pipe of the engine, the operation of the engine of the vehicle is not affected adversely by undue variations in the quality of the combustible mixture supplied through the induction pipe to the engine.

The valve device 2 controlling communication between the two sources of power and the distributing valve device need not necessarily be provided inside the vacuum reservoir 1 as hereinabove described but may be associated therewith in any suitable manner and it will be evident that when the invention is to be applied to brakes of the compressed air type, the vacuum reservior may be replaced by a comprssed air reservoir, the valve device, in this case, being arranged and adapted to control communication between the source of compressed air and a pipe leading to a suitable distributing valve device and between the compressed air reservoir and the pipe leading to a suitable distributing valve device.

It will be evident therefore that the invention is not limited to fluid pressure brakes of the vacuum type or to the particular construction and arrangement of parts hereinabove described, which may be varied as desired to suit particular requirements without exceeding the scope of the invention.

Having now described my invention, what I claim as new and desire to secure by Letters Patent, is:—

1. In a power braking apparatus, the combination with a vacuum source, of a reservoir communicating with said source, a brake supply pipe, and means subject to the opposing pressures of the reservoir and the vacuum source for controlling communication from said vacuum source and from said reservoir to said brake supply pipe.

2. In a power braking apparatus, the combination with a pipe connected to the suction intake of an internal combustion engine, of a reservoir, a movable abutment subject to the opposing pressures of said pipe and said reservoir, a brake pipe, and valve means operated by said abutment and having one position for cutting off communication from the pipe leading to the suction intake to the brake pipe and for connecting the brake pipe to said reservoir.

3. In a power braking apparatus, the combination with a pipe connected to the suction intake of an internal combustion engine, of a reservoir communicating with said pipe, a controlling valve device, a movable abutment subject to the opposing pressures of said pipe and said reservoir, and valve means operated by said abutment for controlling communication from said pipe to said controlling valve device and from the reservoir to said controlling valve device.

4. In a power braking apparatus, the combination with a pipe connected to the suction intake of an internal combustion engine, of a reservoir communicating with said pipe, a brake controlling valve device, a movable abutment subject to the opposing pressures of the reservoir and the pressure in said pipe, and valve means operated by said abutment for connecting said pipe to said controlling valve device when the pressure in said reservoir exceeds the pressure in said pipe and for connecting the reservoir to said controlling valve device when the pressure in said pipe exceeds the pressure in said reservoir.

In testimony whereof I have hereunto set my hand and seal, at Paris, France, this 10th day of October, 1928.

JULES MARIE JOSEPH DORMOY. [L. S.]